United States Patent
Blomgren et al.

[19]

[11] Patent Number: 5,864,112
[45] Date of Patent: Jan. 26, 1999

[54] WELDED PLATE HEAT EXCHANGER AND METHOD FOR WELDING HEAT TRANSFER PLATES TO A PLATE HEAT EXCHANGER

[75] Inventors: Ralf Blomgren, Skanör; Bo Nilsson, Kävlinge; Mats Nilsson, Lund, all of Sweden

[73] Assignee: Alfa Laval AB, Lund, Sweden

[21] Appl. No.: 581,623

[22] PCT Filed: May 17, 1995

[86] PCT No.: PCT/SE95/00554

§ 371 Date: Mar. 22, 1996

§ 102(e) Date: Mar. 22, 1996

[87] PCT Pub. No.: WO95/31682

PCT Pub. Date: Nov. 23, 1995

[30] Foreign Application Priority Data

May 18, 1994 [SE] Sweden .................................. 9401758

[51] Int. Cl.⁶ .............................. B23K 26/00; F28F 3/00
[52] U.S. Cl. .............................. 219/121.64; 219/121.63; 29/890.043; 29/890.054; 165/167
[58] Field of Search ....................... 165/166, 167; 29/890.043, 890.054; 228/183; 219/121.13, 121.14, 121.63, 121.64

[56] References Cited

U.S. PATENT DOCUMENTS

| 4,603,089 | 7/1986 | Bampton | 219/121.64 X |
|---|---|---|---|
| 4,644,129 | 2/1987 | Miller | 219/121.63 |
| 4,940,878 | 7/1990 | McKee et al. | 219/121.64 |
| 5,327,958 | 7/1994 | Machata et al. | 165/167 |
| 5,437,936 | 8/1995 | Johnson | 219/121.63 X |

FOREIGN PATENT DOCUMENTS

| 0 578 933 | 1/1994 | European Pat. Off. . |
|---|---|---|
| 1 248 891 | 8/1967 | Germany . |
| 2 167 175 | 5/1986 | United Kingdom . |
| 2 215 451 | 9/1989 | United Kingdom . |
| 04330 | 3/1993 | WIPO . |
| 15369 | 8/1993 | WIPO .............................. 29/890.054 |

*Primary Examiner*—Leonard R. Leo
*Attorney, Agent, or Firm*—Fish & Richardson P.C.

[57] ABSTRACT

The present invention refers to a plate heat exchanger (1) for heat transfer between two fluids, comprising at least a permanently joined module (2) with several, principally rectangular heat transfer plates (3) equally distributed on each side of an imaginary centre plane (M) of the module, which is parallel to the plane of the heat transfer plates (3), the heat transfer plates (3) having inlet and outlet openings (13, 14) for respective fluids in their corner portions (15) and a heat transfer portion (16) located between respective inlet and outlet openings, in which an intermediate heat transfer plate (3B) has a weld (17A) against a first adjacent heat transfer plate (3A), extending at least round said heat transfer portion and round the inlet and outlet openings for one of the fluids and a weld (17B) against a second adjacent heat transfer plate (3C), extending at least round said heat transfer portion and round the inlet and outlet openings for the second fluid. At least one of said welds (17A, 17B) in at least an adjacent pair of heat transfer plates on each side of said centre plane is done in direction towards said centre plane.

4 Claims, 1 Drawing Sheet

WELDED PLATE HEAT EXCHANGER AND METHOD FOR WELDING HEAT TRANSFER PLATES TO A PLATE HEAT EXCHANGER

FIELD OF THE INVENTION

The present invention refers to a plate heat exchanger for heat transfer between two fluids, comprising at least a permanently joined module with several, principally rectangular heat transfer plates equally distributed on each side of an imaginary centre plane of the module, which is parallel to the plane of the heat transfer plates, the heat transfer plates having inlet and outlet openings for respective fluids in their corner portions and a heat transfer portion located between respective inlet and outlet openings, in which an intermediate heat transfer plate has a weld against a first adjacent heat transfer plate, extending at least around said heat transfer portion and around the inlet and outlet openings for one of the fluids, and a weld against a second adjacent heat transfer plate, extending at least around said heat transfer portion and around the inlet and outlet openings for the second fluid.

BACKGROUND OF THE INVENTION

Permanently joined plate heat exchangers are known for instance by GB 0580368 and GB 2126703. These may be produced in shape of all-welded plate heat exchangers in such a way that the heat transfer plates first are welded together in pairs along an inner line and then two such pairs of plates are welded together along an outer line. An all-welded plate heat exchanger may also be produced in that several heat transfer plates are welded together simultaneously, however, the size of the plate heat exchanger becomes limited to the number of heat transfer plates, which presently may be welded simultaneously.

Previously known all-welded plate heat exchangers cannot be taken apart if a leakage arises, instead the whole of the plate heat exchanger must be discarded in case of a possible defect.

As an alternative to an all-welded plate heat exchanger, modules composed of 10–20 heat transfer plates may be welded together. After testing, the modules are assembled to a complete plate heat exchanger by means of intermediate gaskets, which permit the modules to be dismantled from each other and replaced with new modules in case of a possible defect. Such plate heat exchangers are previously known through SE 304 293 and WO 92/11501. The disadvantage with these is that the intermediate gaskets limit the applicability of the plate heat exchangers.

Conventional welding technique normally requires that a welding tool is applied against both plates, at the welding of the two plates. However, modern welding techniques, such as laser-welding and electronic beam welding, facilitates welding of two closely united plates with use of a welding tool only on one side of the two plates. An advantage with modern welding techniques is also that less heat is generated in the plates, which will be welded together.

With help of modern welding techniques it is possible to weld several heat transfer plates together, by gradually piling the plates on each other and successively welding the plates together by applying a welding tool from only one direction. The first plate thus has previously been placed on a horizontal surface, upon which the remaining plates one after another have been located above and been welded firmly to the plate underneath.

A problem is that the material of the heat transfer plates during welding expands locally by the heat arising from the welding. After joining, the material will crimp during the cooling and consequently welding stresses arise after the welding, which leads to deformation of the heat transfer plates. When only two heat transfer plates are welded together into a module the welding stresses act on the neutral plane of the modules, and therefore no actual deformation arises. When a third heat transfer plate is added the new welding stresses will act outside the neutral plane of the module and thereby tend to curve the module. Each additional heat transfer plate curves the module further. Finally, the curvature becomes too large and it will not be possible to straighten the module without collapsing the corrugation pattern of the heat transfer plates.

SUMMARY OF THE INVENTION

The object of the present invention is to improve the technique to weld heat transfer plates together in a plate heat exchanger to reduce the above described consequence of the welding stresses from arising.

This object is attained with the present invention, which principally is characterized in that at least one of said welds of at least an adjacent pair of heat transfer plates on each side of said centre plane is made in the direction towards said centre plane.

In the present invention the module is turned during welding before any serious curvature arises. Then the welding progresses from the other side of the module. This is repeated until the module is finished. By turning the module the welding stresses will balance each other and their efforts to curve the module are eliminated.

Although, it is enough with only one weld from one side to give a positive effect, at least half of the welds of the heat transfer plates on each side of said centre plane are suitably made in the direction towards said centre plane.

Preferably, all of the welds of the heat transfer plates on each side of said centre plane are made in the direction towards said centre plane.

The invention also refers to a method for welding several heat transfer plates to a plate heat exchanger, in which the heat transfer plates successively are welded against each other, and the welding is executed alternating from one and the other side of an imaginary centre plane of the module, which is parallel to the plane of the heat transfer plates.

BRIEF DESCRIPTION OF THE DRAWINGS

The invention will be described more closely in the following with reference to the accompanying drawing, on which

DETAILED DESCRIPTION

Figure 1:
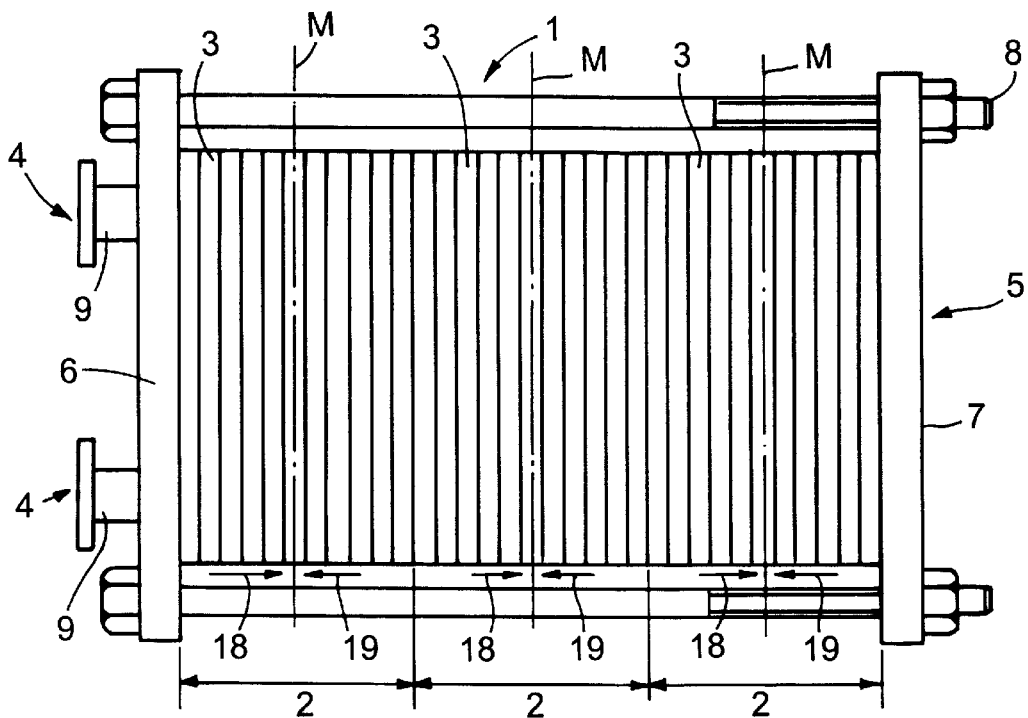
FIG. 1 shows a schematic side-view of a plate heat exchanger according to the invention.

In FIG. 1 a plate heat exchanger 1 for heat transfer between two fluids is shown, comprising several permanently joined modules 2, with several on each side of an imaginary centre plane M in a respective module, equally distributed principally rectangular heat transfer plates 3. The centre line M is located parallel to the plane of the heat transfer plates 3 and in the middle of the module. The plate heat exchanger 1 has passages 4 for respective fluids. The modules 2 are located in a conventional frame 5, comprising at least a front end plate 6 and a rear end plate 7, and several tightening bolts 8. The front end plate 6 has connections 9, communicating with the passages 4.

Figure 2:
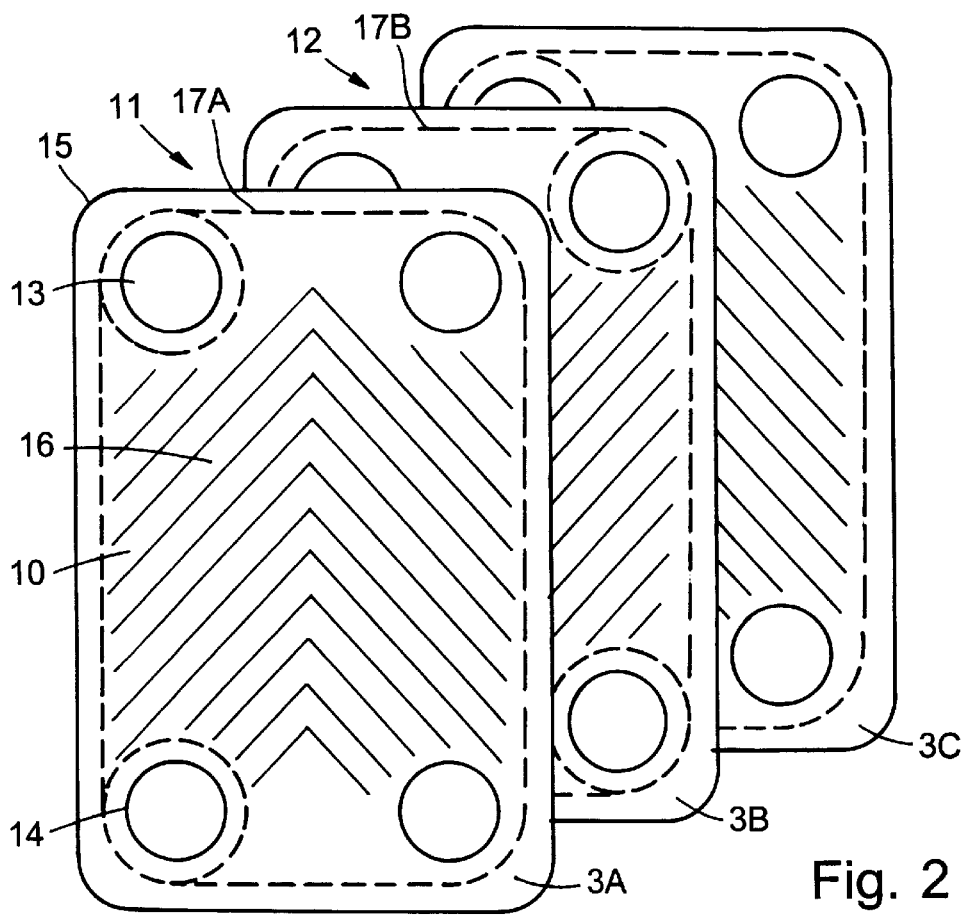
FIG. 2 shows a schematic view of three heat transfer plates included in the plate heat exchanger according to FIG. 1.

In FIG. 2 three heat transfer plates 3A, 3B and 3C are shown, which by means of pressing is provided with a corrugation pattern 10, in the shape of ridges and grooves. The ridges of alternating heat transfer plates abut against each other. The heat transfer plates are welded against each other and delimit in every second plate interspace 11 a flow space for the first fluid and in the remaining plate interspaces 12 flow spaces for the second fluid. The heat transfer plates have inlet and outlet openings 13 and 14 for respective fluids in their corner portions 15 and a heat transfer portion 16 located between respective inlet and outlet openings, in which an intermediate heat transfer plate 3B shows a weld 17A against a first adjacent heat transfer plate 3A, extending at least around said heat transfer portion 16 and around the inlet and the outlet openings 13 and 14 for one of the fluids and a weld 17B against a second adjacent heat transfer plate 3C, extending at least around said heat transfer portion 16 and around the inlet and the outlet openings 13 and 14 for the second fluid. The welds 17A and 17B are slightly displaced relative to each other, which does not appear in the schematic FIG. 2.

The heat transfer plates 3 are elongated and mainly rectangular, although other shapes, such as round, also are possible, and are produced of thin metal plate, which by means of pressing is provided with a conventional corrugation pattern.

The inlet and outlet openings 13 and 14 for the first fluid are located at one long side of the heat transfer plates 3 and the inlet and outlet openings 13 and 14 for the second fluid are located at the other long side of the heat transfer plates 3, in case of a so called parallel flow, that is, when the main flow directions for the fluids, flowing on each side of the heat transfer plates, intend to be parallel. Naturally, the heat transfer plates 3 may also be adapted to diagonal flow if desired.

The joining of the heat transfer plates 3 into a plate heat exchanger 1, is executed successively in that the plates are welded against each other alternating from one and the other side of an imaginary centre plane, which is parallel to the plane of the heat transfer plates 3. In a finished plate heat exchanger 1, according to the invention, at least one of the welds 17A or 17B of at least an adjacent pair of heat transfer plates 3 on each side of said centre plane M is performed in the direction towards said centre plane, as indicated by the arrows 18, 19 in FIG. 1.

Naturally, the modules are turned during the welding before any serious curvature has arisen. Then the welding is continued from the other side of the module. This is repeated until the module is finished. By turning the module the welding stresses will balance each other and their efforts to curve the module are eliminated.

Although it is enough with only one weld, from one side to give a positive effect, at least half of the welds of the heat transfer plates on each side of said centre plane are suitably done in the direction towards said centre plane.

Preferably, all of the welds of the heat transfer plates on each side of said centre plane are done in the direction towards said centre plane, that is, the welding is performed alternating from one and the other side of the centre plane.

What is claimed is:

1. A plate heat exchanger (1) for heat transfer between two fluids, said heat exchanger comprising at least one permanently joined module (2) having a plurality of principally rectangular, welded together heat transfer plates (3) each having corner portions and having inlet and outlet openings (13, 14) for the fluids in said corner portions (15) and further having heat transfer portions (16) located between said inlet and outlet openings, the heat transfer plates comprising an intermediate heat transfer plate (3B) having a first weld (17A) which engages a first adjacent heat transfer plate (3A) and which is made from one side of the two plates (3A, 3B) engaged by the first weld, said first weld extending at least around the heat transfer portions (16) of the two plates and around the inlet and outlet openings for one of the fluids, said intermediate heat transfer plate (3B) having a second weld (17B) which engages a second adjacent heat transfer plate (3C), positioned on an opposite side of the intermediate heat transfer plate (3B) from the first adjacent heat transfer plate (3A), said second weld (17B) being made from one side of the two plates (3B, 3C) engaged by the second weld and extending at least around the heat transfer portions (16) of the two plates and around the inlet and outlet openings for the second of the fluids, said plurality of heat transfer plates being equally distributed on opposite sides of an imaginary center plane (M) of said module, said center plane (M) running parallel to the planes of the heat transfer plates (3), wherein there is at least one intermediate heat transfer plate (3B) on each side of the center plane (M), and wherein at least one of the first and second welds of each intermediate heat transfer plate (3B) is made in the direction of the center plane (M).

2. The plate heat exchanger according to claim 1, wherein at least half of said welds (17A, 17B) on each side of said center plane (M) are made in the direction of the center plane (M).

3. The plate heat exchanger according to claim 1, wherein all of said welds (17A, 17B) on each side of said center plane (M) are made in the direction of the center plane (M).

4. A method for welding a plurality of principally rectangular heat transfer plates (3) against one another to form a permanently joined module (2) for a plate heat exchanger (1) for heat transfer between two fluids, said heat transfer plates (3) each having corner portions and having inlet and outlet openings (13, 14) for the fluids in said corner portions (15) and having heat transfer portions (16) located between said inlet and outlet openings, the heat transfer plates comprising an intermediate heat transfer plate (3B), comprising the steps of welding the intermediate heat transfer plate (3B) and a first adjacent heat transfer plate (3A) together, from one side of the two plates (3A, 3B), at least around the heat transfer portions (16) of the two plates and around the inlet and outlet openings for one of the fluids, welding the intermediate heat transfer plate (3B) and a second adjacent heat transfer plate (3C), positioned on an opposite side of the intermediate heat transfer plate (3B) from the first adjacent heat transfer plate (3A), together at least around the heat transfer portions (16) of the intermediate and second adjacent heat transfer plates and around the inlet and outlet openings for the second of the fluids, wherein the welding together of the second adjacent heat transfer plate (3C) and the intermediate heat transfer plate (3B) is performed on the opposite side of an imaginary center plane (M) of said module, said center plane (M) running parallel to the planes of the heat transfer plates, from said one side where the welding together of the first adjacent heat transfer plate (3A) and the intermediate heat transfer plate (3B) occurred and thereafter welding additional adjacent heat transfer plates alternately on said one side and then the opposite side of the imaginary center plane (M) until the plurality of heat transfer plates have all been welded together, and wherein all of the welding is done in the direction of the imaginary center plane (M).

\* \* \* \* \*